Patented June 19, 1951

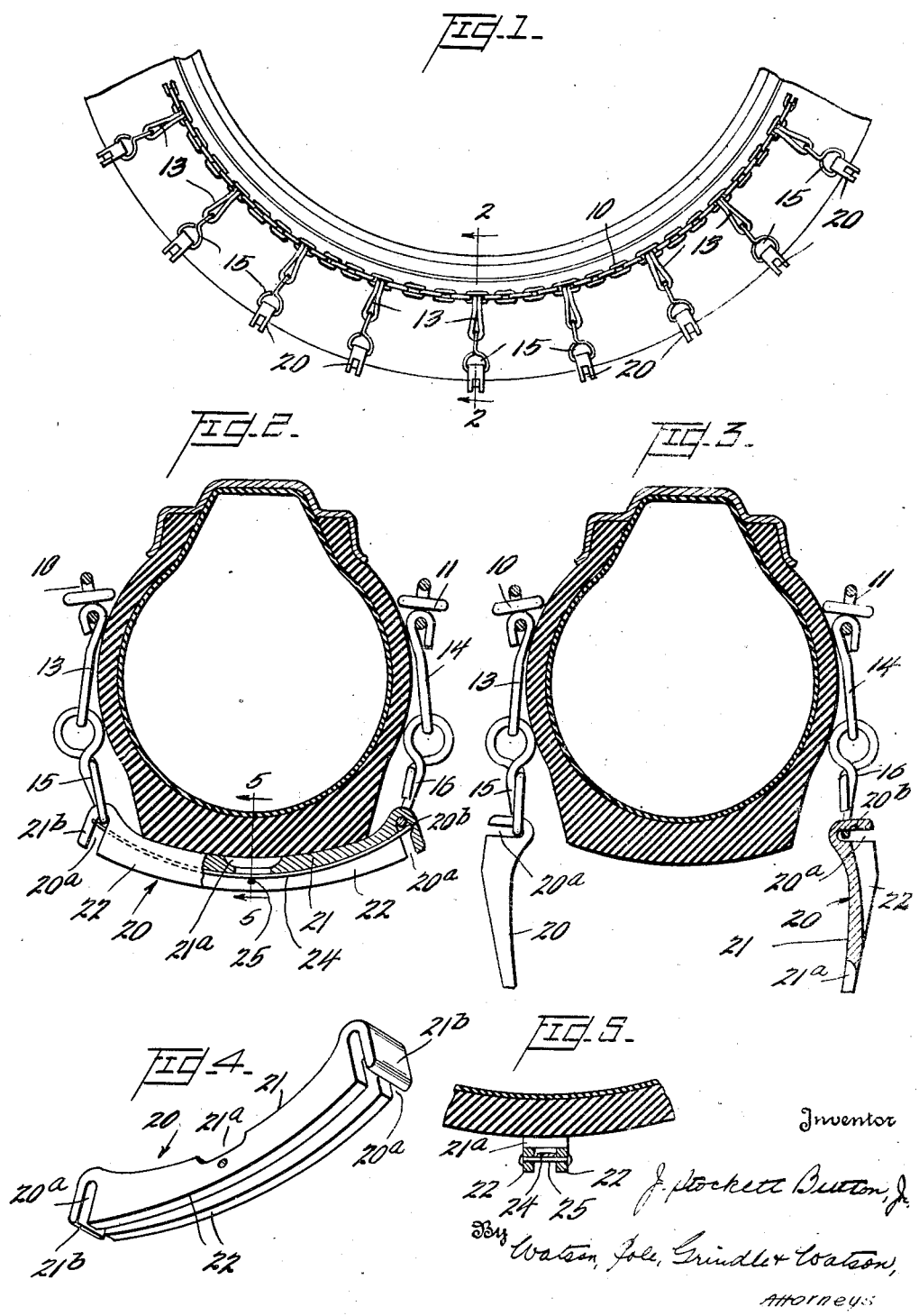

2,557,725

UNITED STATES PATENT OFFICE 2,557,725

TRACTION DEVICE FOR VEHICLES

John Stockett Button, Jr., Baltimore, Md., assignor to Riggs Distler & Co., Inc., Baltimore, Md., a corporation of Maryland Application June 9, 1948, Serial No. 31,881

9 Claims. (Cl. 152—228)

This invention relates to traction devices for vehicles and particularly to the type of traction device which is primarily intended for use in association with vehicle wheels which are equipped with pneumatic tires.

Very many specifically different designs of traction devices for use in association with pneumatic tires have heretofore been suggested and a number of these have been made available to users. Certain types of such devices are generally known as tire chains, each such chain comprising essentially two endless or continuous chain members and a series of cross links connecting such members, the cross links being adapted to extend transversely across the tread surface of a tire upon which the chain is mounted, to provide the needed additional frictional contact with the ground or roadway surface, the endless chains lying, respectively, against the oppositely facing tire side walls, each cross link having its ends connected to both of the supporting chains. In another form of vehicle traction device, commonly utilized in association with wheels of the spoked variety, the endless or continuous chains are dispensed with and there is associated with each tire tread engaging cross member, whether this member be a bar, plate or series of connected links, some means for transversely encircling the tire and the wheel rim upon which it is mounted, so as to maintain the cross bar or cross chain in operative relationship upon the wheel at all times.

It is customary in the manufacture of traction devices of the general nature of those just referred to to fabricate the road or ground engaging cross members, whether these members are in the form of chains, bars or plates, of relatively soft metal in order that these members may resist breakage due to repeated impact against the surface of the road over which the vehicle with which they are associated is moving. These impacts come in rapid succession and are severe and cross members of harder metals will break before wearing through. Because of the fact that the cross members are fabricated of soft metal, however, they are rapidly worn away in continued use and eventually break. Breakage of a cross link or bar is usually at its midpoint, directly under the center of the tread of the tire, where the wear is greatest, and the two separated portions of the cross member will, when such breakage occurs, be thrown outwardly by centrifugal force. In the usual case the outer ends of the broken portions of the cross link or bar extend substantially beyond the tire tread surface, sufficiently far to come into repeated contact with the mudguards of the vehicle as the wheel revolves. Continued rotation of the wheel under such circumstances causes denting or fracture of the mudguards, and the noise caused by impact of the portions of the broken cross links beating against the metallic mudguards is, of course, extremely objectionable. The damage and noise must continue, however, until the vehicle is stopped and the chain removed or the broken link or bar detached.

It is the purpose of the present invention to provide an improved type of traction device, equipped with tire tread engaging members which may be either chains, bars or plates, which members are so designed and constructed, and are so attached to the means for holding them in operative position that, when breakage occurs, the broken portions automatically disconnect themselves from the holding means, and fall to the roadway, so as not to repeatedly contact the fender of the vehicle, to the injury of that fender and annoyance of the driver and others. The invention contemplates the use of a novel cross tread member in association with various means for securing the member in operative position against the tire tread, it being immaterial whether this attaching or anchoring means includes continuous chains which are adapted to lie against the sides of the tire, or includes one or more elements encircling the tire. The greatest advantage will be realized, however, when the improved cross tread member is used in association with the common type of tire chain, which includes endless chains lying against the tire side walls since, when so used, and breakage occurs, it is not necessary for the operator to remove the entire chain as heretofore for the purpose of repair or to eliminate noise and possible injury to the vehicle fenders. No stoppage of the vehicle is necessary, in fact the driver may not know that a cross chain has broken.

The invention may be embodied in various forms, as previously indicated, and one embodiment is illustrated in the accompanying drawings, and will be described in detail, by way of example.

In the drawings:

Figure 1 is a side elevation of portion of the wheel of a vehicle equipped with a pneumatic tire, to which wheel the improved traction device has been applied;

Figure 2 is a section on line 2—2 of Figure 1, showing one of the improved cross tread members, such member being shown as partially broken away;

Figure 3 is a similar view showing the relative positions of the broken parts of the cross tread member after breakage has occurred;

Figure 4 is a perspective view of one of the cross tread members; and

Figure 5 is a section on line 5—5 of Figure 2.

The continuous or endless chains of the traction device, which encircle the wheel axis and lie against the tire side walls, are indicated at 10 and 11 respectively. Attached to chains 10 and 11, at regular intervals, are members 13 and 14 which extend radially outward, and to each of these members is attached an element having an outer loop which is designed and intended to receive and be engaged by one end of a transversely extending cross tread member, these elements being indicated at 15 and 16 respectively. The cross tread members are indicated at 20 and, in the form of the invention shown, each comprises an elongated bar, channel shaped in cross section so as to provide a tire tread surface engaging web 21 and two parallel outwardly extending road engaging ribs 22. The web 21 is preferably cut away centrally as at 21a so that the cross tread member is somewhat weaker at its midpoint than elsewhere, and is provided at each end with a flange 21b disposed parallel to the adjacent end surfaces of ribs 22, the flanges 21b and the adjacent rib end surfaces defining slots 20a disposed transversely to the longitudinal axis of the member and opening outwardly through the ground engaging surface thereof.

The recesses or slots 20a receive the relatively straight outer portions of the loops 15 and 16 previously described and, when the cross tread members 20 and the loops 15 and 16 are associated as they are shown to be in Figure 2, each cross tread member will be retained in operative position upon the wheel, with the curved inner face of its web 21 in engagement with the tire tread surface. An elongated locking element is indicated at 24 and it will be observed that this locking element lies against the outer face of the web 21 of member 20 and between the mutually facing inner faces of the outwardly extending ribs 22 so that it is supported substantially throughout its entire length, and protected against injury until the ribs 22 are worn away. The ends of the element 24, which is preferably fabricated of resilient metal such as steel, project, respectively, across the loop receiving recesses 20a and into notches 20b, these end portions thus bridging recesses 20a and serving to confine loop members 15 and 16 within the respective recesses 20a. Locking element 24 is retained in position, with its ends within recesses 20b respectively, by means of a pin or similar element 25, seated in aligned apertures in ribs 22.

When a tire so equipped is in use wear of the cross tread members 20 will naturally take place and the wear will naturally proceed at the most rapid rate at the center of the member. As the cross tread member becomes more and more worn away centrally it becomes structurally weaker and eventually, when the thickness of the member has been materially reduced, the member will break. Breakage will occur at approximately the center of the member, where it is weakest and where the wearing away has proceeded most rapidly. As a result of such breakage the locking element 24 will be displaced, if it has not already been worn so as to break, and will be thrown from locking position. The two portions of the broken cross member 20 will fly at once radially outwardly under the influence of centrifugal forces so as to occupy the positions shown in Figure 3 and each will thereafter promptly detach itself from its supporting loop, the locking element being no longer effective and the slots or recesses 20a being so inclined with respect to the axis of the wheel as to encourage or facilitate disengagement of the portions of member 20 from the loops 15 and 16. These broken tread members, therefore, are thrown outwardly onto the road and may not repeatedly strike the fender of the vehicle as the wheel rotates. When the breakage is discovered a fresh cross tread member may be readily applied.

It will be clear that cross tread members capable of functioning in the manner described may have any one of a number of specifically different forms and that the invention is not limited to that embodiment which has been disclosed by way of example. It will also be apparent that the type of means for maintaining the cross tread in operative position upon a tire may be widely varied without departure from the invention.

Having thus described the invention, what is claimed as new and desired to be secured by Letters Patent is:

1. A cross tread member for a vehicle traction device, said member having means whereby it may be secured to tire engaging attachment devices, said means including an elongated element extending longitudinally of said member, and a part positioned centrally of said member for retaining said element in position until said member breaks.

2. In a traction device for vehicles, in combination, a cross tread member and means for retaining said member in operative position transversely of and bearing against the tread of a tire to provide increased traction, said member being so constructed that it will break through a cross section intermediate its ends after having been reduced in thickness at that section due to wear, said means and at least one end portion of said member having parts which mutually interlock so long as said member remains unbroken to maintain said member in operative position, and which mutually disengage after said member has broken and such end portion has swung outwardly away from the tread of the tire, to release said broken end.

3. In a traction device for vehicles, in combination, a cross tread member and means for retaining said member in operative position transversely of and bearing against the tread of a tire to provide increased traction, said member being so constructed that it will break through a cross section intermediate its ends after having been weakened by wear, said means and the ends of said member having parts which mutually interlock so long as said member remains unbroken, to maintain said member in operative position, which parts mutually disengage after said member has broken and the broken portions thereof have swung outwardly away from the tread of the tire, such portions thus being wholly disconnected from said means.

4. In a traction device for vehicles, in combination, a cross tread member and means for retaining said member in operative position transversely of and bearing against the tread of a tire to provide increased traction, said member being so constructed that it will break through a cross section intermediate its ends after having been weakened by wear, said member having recesses at its ends extending transversely thereof from openings formed in the ground engaging face, and said means having elements normally disposed within said recesses and which secure said member in operative position so long as it remains unbroken, breakage of said member intermediate its ends permitting the portions thereof to swing outwardly away from the tread of the tire and the said elements to escape from said recesses, said broken portions of the member being thus wholly disconnected from said means.

5. The combination set forth in claim 4 in which said elements comprise loops which encircle the said member.

6. The combination set forth in claim 4 in which said recesses are in the nature of slots, each such slot being so disposed with respect to said member that the separation of each portion of the member, after breakage thereof, from the associated holding element, is facilitated.

7. The combination set forth in claim 4 in which a device is provided for normally locking said elements in the slots of said member, said device becoming ineffective when said member breaks.

8. The combination set forth in claim 4 in which a device is provided for normally locking said elements in the slots in said member, said device comprising a single elongated part which bridges both of said slots.

9. The combination set forth in claim 3 in which said member is of reduced cross section at a point midway of its length, to insure breakage at that point when said member has become excessively worn.

JOHN STOCKETT BUTTON, Jr.

REFERENCES CITED

The following references are of record in the file of this patent:

UNITED STATES PATENTS

| Number | Name | Date |
|---|---|---|
| 1,537,567 | Thomas | May 12, 1925 |
| 2,202,319 | Round | May 28, 1940 |